United States Patent [19]
Tanimizu et al.

[11] Patent Number: 6,005,977
[45] Date of Patent: Dec. 21, 1999

[54] METHOD FOR POSITIONAL MATCHING OF IMAGES AND SYSTEM FOR TESTING PRODUCTS BY USING THE SAME

[75] Inventors: Katsuyuki Tanimizu, Tokyo; Akira Shindo, Atsugi; Masakatsu Nunotani, Machida; Tetsuya Yamamoto, Kawasaki, all of Japan

[73] Assignee: Nippon Telegraph & Telephone Corp. N.T.T. Fanet Systems Corp., Tokyo, Japan

[21] Appl. No.: 08/682,373

[22] Filed: Jul. 17, 1996

[30] Foreign Application Priority Data

Jul. 20, 1995 [JP] Japan ................... 7-183654

[51] Int. Cl.⁶ ............... G06K 9/00; G06K 9/32; G06K 9/62
[52] U.S. Cl. ............ 382/216; 382/141; 382/294
[58] Field of Search ................... 382/209, 149, 382/181, 294, 151, 147, 287, 289, 293, 319, 216, 112, 133, 134, 135, 136, 137, 141, 144, 152; 355/53, 54; 358/526; 250/558

[56] References Cited

U.S. PATENT DOCUMENTS

| | | | |
|---|---|---|---|
| 4,153,897 | 5/1979 | Yasuda et al. | 382/216 |
| 4,443,096 | 4/1984 | Johannsmeier et al. | 355/53 |
| 4,473,293 | 9/1984 | Phillips | 355/53 |
| 4,499,595 | 2/1985 | Masaitis et al. | 382/177 |
| 4,614,430 | 9/1986 | Hara et al. | 382/149 |
| 4,783,826 | 11/1988 | Koso | 382/147 |
| 4,797,941 | 1/1989 | Lloyd et al. | 382/205 |
| 5,023,917 | 6/1991 | Bose et al. | 382/149 |
| 5,065,440 | 11/1991 | Yoshida et al. | 382/219 |
| 5,067,162 | 11/1991 | Driscoll, Jr. et al. | 382/126 |
| 5,321,772 | 6/1994 | Sawyer | 382/216 |
| 5,495,535 | 2/1996 | Smilansky et al. | 382/145 |
| 5,712,921 | 1/1998 | Zabele | 382/112 |

*Primary Examiner*—Edward L. Coles
*Assistant Examiner*—David Rosenblum
*Attorney, Agent, or Firm*—Dickstein, Shapiro, Morin & Oshinsky LLP

[57] ABSTRACT

The present invention provides an image matching method which allows non-linear image positional shifts to be corrected on a real time basis, and an economical product testing system using this method. A two dimensional test image, consisting of pixels arranged as a matrix of bits distributed in both the vertical direction and the horizontal scanning direction, and an associated reference image are subjected to template matching at a cell matching arithmetic unit for each of line blocks consisting of a plurality of scan lines. The result of the template matching are quantitatively evaluated at an evaluation unit as being good or bad, and positional shifts are sequentially computed according to good evaluation results. Based on the positional shifts thus obtained, the comparative pixel addresses are accordingly corrected before the two images are compared at the comparator.

12 Claims, 6 Drawing Sheets

METHOD FOR POSITIONAL MATCHING OF IMAGES AND SYSTEM FOR TESTING PRODUCTS BY USING THE SAME

TECHNICAL FIELD

The present invention generally relates to a system for testing (inspecting) the external appearance of products by using image processing technology, and in particular to a method for compensating for positional shifting of one of two images with respect to the other by capturing the two images as groups of pixel data given as gradation values (so-called gray scale image values) or binary data, and computing positional shifting of image patterns between the two images according to such data so that it may be applied to systems for measuring positional shifting between images, and to a system for testing products based on this method.

BACKGROUND OF THE INVENTION

The recent development in image processing technology and semiconductor technology has accelerated the automatization of the visual inspection tests of printed matters, and a number of testing systems based on the comparison of gradation image data have already been put into practical uses. The basic principle of the comparison method comprises the steps of registering an external picture image of a good product as a reference for comparison, obtaining a difference of each pixel of the picture image of the product to be tested from that of the reference image, and determining the acceptability of the product according to the magnitude of the differences.

It has also been proposed to compare consecutive the picture images of the products which are continually captured in time sequence.

According to these conventional methods, because the working principle is based on the evaluation of the differences between the two images in either case, it is essential to be free from any undue positional shifting between the picture patterns of the two images. If there any significant positional shifting, it results in amplified difference values, and the product is inevitably judged as defective. Thus, so-called pseudo defects would occur so frequently that a satisfactory testing procedure could not be carried out.

Therefore, previously, frequent occurrences of pseudo defects have been avoided by computing positional shifting between the two images with image processing means, and positional corrections have been conducted on the images according to the detected positional shifting between them before comparing the two images. A number of methods have been proposed according to the magnitude and nature of the particular positional shifting that is required to be corrected. If the positional shifting is limited to translation in x and y directions, the positional shifting $\Delta x$ and $\Delta y$ in x and y directions can be found by conducting a so-called template matching, using a representative region of a reference image, with respect to a neighborhood of the corresponding region of the test image. When the image involves extension/shrinkage and rotation as its positional shifting, the positional correction can be carried out by using a so-called geometric transformation process.

FIG. 5 is a conceptual diagram of a typical geometric transformation process used for positional correction according to the conventional method, and FIG. 6 is a flow chart of this process. An evaluation based on self differences is made with respect to a picture pattern of a reference image stored in reference image memory 102 obtained from an external appearance of a good product, and a desired number of regions (which are called as "cells" hereinafter) are selected as templates for computing positional shifting. The cells are selected from regions having large self differences such as regions including outlines.

In the example given in FIG. 5, six cells are selected. The image of the external appearance of the tested product is captured and stored in test image memory 103 as a test image. Once a full frame of the test image is entered in the test image memory 103, a template matching is carried out in a matching computation unit 104 with respect to each of the regions of the test image corresponding to the selected cells in the reference image, and the positional shifting ($\Delta x_e$, $\Delta y_e$) (e=1, 2, 3, 4, 5, 6) at each of the cell positions (cell regions) is computed. According to these six positional shift values, the coefficients of the equation of geometric transformation (affine transformation in this case) or the transformation parameters are determined in a transformation parameter generating unit 105.

$$x_{0i} = T11 x_{1i} + T12 y_{1i} + T13 \quad (1)$$

$$y_{0i} = T21 x_{1i} + T22 y_{1i} + T23 \quad (2)$$

where $x_{0i}$: x-address of a pixel of the reference image $y_{0i}$: y-address of a pixel of the reference image $x_{1i}$: x-address of a pixel of the test image corresponding to that of the reference image with respect to the picture pattern thereon $y_{1i}$: y-address of the pixel of the test image corresponding to that of the reference image with respect to the picture pattern thereon $T_{ij}$: transformation parameters The generated equation of transformation is stored in an address transformation unit 106, and the pixel addresses ($x_{1i}$, $y_{1i}$) of the test image which correspond to the predetermined pixel addresses ($x_{0i}$, $y_{0i}$) of the reference image and have been subjected to positional correction are generated by this equation of transformation. Thus, during the test procedure, the pixels at the addresses ($x_{1i}$, $y_{1i}$) of the test image that are to be compared with those pixels at the corresponding addresses ($x_{0i}$, $y_{0i}$) of the reference image are supplied to a comparator 107, and the results of comparing the gradation values of the pixels on which positional shifting is corrected are produced so that the test image may be evaluated as either good or bad.

However, according to the conventional method, because the positional shifting is corrected with a geometrical process after the entire test image has been captured, and is based on the assumption that the extension/shrinkage and the translation of the picture pattern are uniform over the entire image, thus allowing a linear approximation to be applied to the two images to be compared, if there is any non-linear positional shifting or positional shifting involving localized extension/shrinkage, and the magnitude of extension/shrinkage varies from one place to another on the same image, the positional shifting cannot be totally eliminated even after a positional correction has been made, and the test of the external appearance based on such image processing may erroneously judge the product to be defective even when the product is quite normal. Also, because positional shifting is computed and positional correction is made after the entire image has been captured, memory for storing the entire image is required, and it means a high cost for the system, and a long processing time.

BRIEF SUMMARY OF THE INVENTION

In view of such problems of the prior art, a primary object of the present invention is to provide a method for image matching which allows positional correction to be made even in the case of non-linear positional shifting which the prior art has been inadequate to deal with.

A second object of the present invention is to provide a method for image matching which can carry out the positional correction substantially simultaneously as the capturing of the image on a real time basis without involving any excessive time delay which would be otherwise required to capture the entire image before making any positional correction.

A third object of the present invention is to provide a method for image matching which can eliminate the need for memory for storing the entire frame of the picture image is eliminated, thereby reducing the processing time and the cost for hardware.

A fourth object of the present invention is to provide a method for image matching which allows a stable positional matching to be achieved without any substantial error.

A fifth object of the present invention is to provide a method for image matching which can accommodate occasional errors in the input without producing any abnormal results in image matching.

A sixth object of the present invention is to provide a method for image matching which can reduce the so-called search area when conducting the template matching so that the processing time can be substantially reduced while the tolerance to the positional shifting is increased.

A seventh object of the present invention is to provide a method for image matching which can allows accumulation of positional shifts can be properly accounted for in the process of image matching.

An eighth object of the present invention is to provide a system for testing products using this method.

According to the present invention, these objections are accomplished by providing a method for positional matching of images, wherein image data of two images of an identical picture pattern is compared by using image data of one of the images as reference image data, and positional shifting between the two images are compensated for when determining an identity of the two images according computed differences between them, characterized by that: as a horizontal scan line or a group of horizontal scan lines are transferred in a sequential manner, a positional shifting computing process for the images, and a positional matching compensation process based on the computed positional shifting are conducted for each of line blocks which are formed by a predetermined number of consecutive horizontal scan lines with respect to the two images of a nominally identical image pattern.

According to the present invention, a two dimensional image consisting of pixels arranged vertically as individual bits and horizontally along each scan line (gradation value data or binary data) is divided into individual line blocks consisting of a number of scan lines, and positional shifting is computed and positional correction is carried out for each line block. Therefore, as opposed to the prior art, the need for memory for storing the entire frame of the picture image is eliminated, and the processing time delay due to the need for storing the entire image can be substantially reduced while reducing the cost at the same time. Also, by carrying out the positional correction for each line block, it becomes possible to deal with non-linear positional shifts.

A second aspect of the present invention provides a method for positional matching of images, wherein the positional shifting computing process comprises the steps of: dividing each line block of the reference image into a number of cells; conducting a template matching on the reference image by using the cells as templates; selecting those cells which are effective in computing positional shifting by quantitatively evaluating the results of the template matching; classifying the selected cells into x-, y- and xy-cells as those which are effective in detecting the shifting in x, y and both x and y directions, respectively, and registering them as such; and conducting a template matching with respect to the other image by using the registered selected cells as templates, and computing positional shifting of the other image according to the result of the template matching.

According to the method for positional matching of images provided by the second aspect of the present invention, when computing positional shifting for each line block by template matching, a novel algorithm is used wherein the cells for template matching are selected by quantitatively evaluating the results of the plate matching conducted on the reference image so that the cells are automatically selected from areas which provide optimum template matching or the cells are automatically selected so as to be optimum templates. More specifically, template matching is conducted with respect to the reference image to select certain cells, and the cells thus selected according to the quantitative evaluation of the results of self template matching are classified into three kinds of cells, or x cells, y cells and xy cells according to the stability of template matching in the x and y directions, and are so registered. As a result, the cells are selected from optimum locations according each particular picture pattern (the distinction between good match and poor match is very clear, and pseudo matching does not occur within the search area), and a stable positional matching can be achieved without any substantial error.

A third aspect of the present invention provides a method for positional matching of images, wherein the positional shifting computing process comprises the steps of: conducting a template matching with respect to the other image by using selected cells, obtained by dividing each of the line blocks of the reference image into a number of cells, as templates; quantitatively evaluating the results of the template matching as being either good or bad; and computing the positional shifting of the images according to the results of the template matching which are evaluated as being good.

According to the method for positional matching of images provided by the third aspect of the present invention, a novel algorithm is used wherein the results of template matching between the reference image and the test image are quantitatively evaluated, and good matching results are used for obtaining positional shifting while abnormal positional shift values are rejected so that data which is likely to contain large errors is removed from the computation, and the positional matching can be accomplished in a short time in a stable fashion without involving any substantial errors.

A fourth aspect of the present invention provides a method for positional matching of images, wherein if there are a plurality of cells serving as templates or selected cells in a line block of the reference image, there are a plurality of good matching results, and a plurality of incidences of positional shifting are obtained for a corresponding line block of the other image, then, the result of the positional shifting computing process is given as an average of the incidences of positional shifting.

According to the method for positional matching of images provided by the fourth aspect of the present invention, positional shift correction value for each line block is given by averaging the positional shift values of the cells or the selected cells in the line block, positional shift correction process can be carried our for each line block in a stable manner, with a minimum error, by using a minimum amount of hardware, and in a short time.

A fifth aspect of the present invention provides a method for positional matching of images, wherein if the positional shifting computed for a certain line block is greater than that of the preceding line block by more than a threshold value, the positional shifting of the certain line block is set equal to a redetermined value.

According to the method for positional matching of images provided by the fifth aspect of the present invention, it is possible to avoid any undesirable results which could occur if too much error is caused by pseudo matching, or to avoid the cases of excessive positional shift correction which are excessive in the sense that the amount of positional shift correction far exceeds what are actually possible.

A sixth aspect of the present invention provides a method for positional matching of images wherein when a template matching is conducted for a certain line block with respect to the other image by using the cells or the selected cells of the reference image as templates, the address of each of the cells of the other image is compensated for according to the positional shifting of the preceding line block with respect to the cell or the selected cell of the reference image at the corresponding address.

According to the method for positional matching of images provided by the sixth aspect of the present invention, when a template matching using the cells or the selected cells of the reference image is executed with respect to the corresponding area of the test image, by correcting the addresses of the test image according to the positional shifting in the preceding line block, it is possible to reduce the so-called search area when conducting the template matching, and the processing time can be substantially reduced while the tolerance to the positional shifting can be increased.

A seventh aspect of the present invention provides a method for positional matching of images, wherein the positional matching compensation process for each of the line blocks is conducted according to the positional shifting of one of the line blocks preceding the current line block or the positional shifting of one of the line blocks following the current line block.

According to the method for positional matching of images provided by the seventh aspect of the present invention, accumulation of positional shifting can be properly accounted for.

An eighth aspect of the present invention provides a system for testing products by using the method for positional matching of images, comprising: image capturing means for sequentially entering a horizontal scan line or a group of horizontal scan lines of an image of a product to be tested; positional shifting computing means for computing positional shifting of an image based on cell matching conducted for each line block consisting of a prescribed number of adjacent horizontal scan lines of the test image and a reference image; compensating means for compensating the positional shifting of the test image with respect to the reference image according to the positional shifting computed by the positional shifting computing means; difference computing means for comparing the test image, for which the positional shifting was compensated, with the reference image, and obtaining differences between them;

and judging means for judging each product whether it is defective or not by determining the identity of the two images according to the computed differences between them; the positional shifting of each line block being compensated for before determining the identity of the two images.

According to the system for testing products by using the method for positional matching of images provided by the eighth aspect of the present invention, the shape of the product and the picture pattern on the product can be evaluated on a real time basis, with a minimum amount of hardware, in a short time, while tolerating the presence of non-linear image positional shifting.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
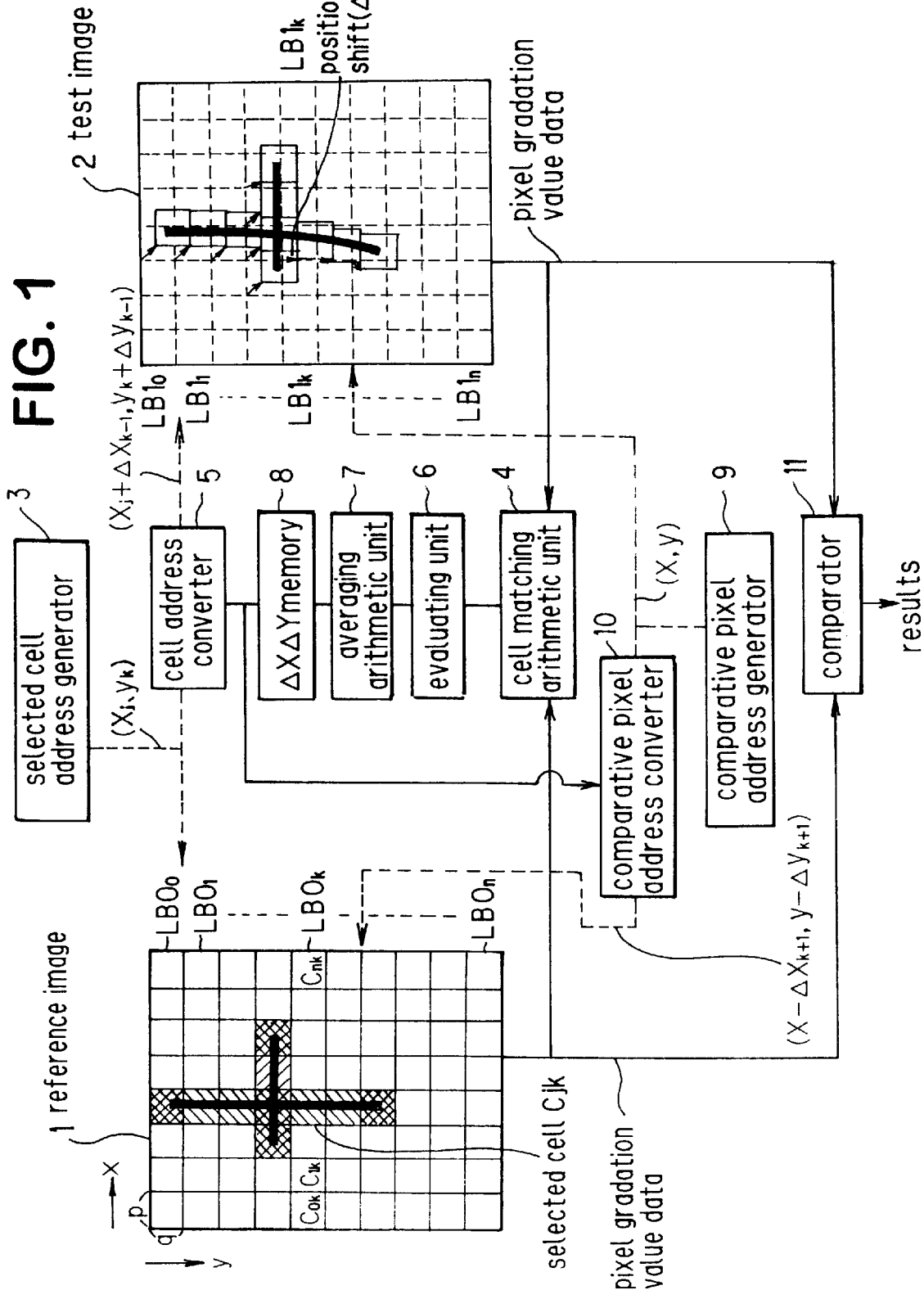
FIG. 1 is a conceptual diagram of the first embodiment of the present invention to illustrate the principle of image position matching.

FIG. 1 is functional block diagram of a first embodiment of the present invention for describing the basic concept of the present invention. A reference image 1 is stored in data storage means such as reference image memory, and is expressed by a two-dimensional matrix. The x-addresses of the two-dimensional matrix corresponds to the bit locations along the scan line in image input scanning, and the y-addresses correspond to the line locations in image input scanning. Every q lines of the image plane are bundled into a line block so that the entire image plane may be divided into n line blocks ($LBO_0, \ldots, LBO_k, \ldots, LBO_n$). Each line block is divided into cells ($C_{0k}, C_{1k}, \ldots, C_{jk}, \ldots, C_{mk}$) each having a width of q bits.

Once a reference image 1 is captured and stored, a matching arithmetic operation involving a local shifting is carried out in each of the cells on the reference image 1, and those of the cells suitable for use as templates in an evaluation algorithm (which is described hereinafter) are selected and stored as selected cells. Normally, cells including clear picture patterns are selected as selected cells. In the case of FIG. 1, the shaded cells covering a cross-shaped picture pattern are selected as selected cells. The selected cells include x cells, y cells, and xy cells. x cells are those selected sells which are effective only for computing shifts in the x-direction, and include patterns involving relatively small changes in the y-direction (those marked by the left end down hatching pattern in the drawing). Likewise, y cells are those selected sells which are effective only for computing shifts in the y-direction, and include patterns involving relatively small changes in the x-direction (those marked by the right end down hatching pattern in the drawing). xy cells are those selected cells which are effective for computing shifts in both the x- and y-directions, and involve image patterns involving large changes in both the x- and y-directions (those marked by the crossed hatching pattern in the drawing).

The addresses of the selected cells are recorded, and a selected cell address generator 3 generates the addresses of the selected cells for each line block in synchronism with the input of a test image 2. For instance, when line block $LB1_{K+1}$ of the test image 2 is being entered, the selected cell address generator 3 generates the addresses $(x_j, y_k)$ of the selected cell $C_{jk}$ in the line block $LB0_k$ so that the pixel gradation value data of the selected cell $C_{jk}$ of the reference image 1 is forwarded to a cell matching arithmetic unit 4.

Meanwhile the addresses $(x_j, y_k)$ produced from the selected cell address generator 3 are forwarded to a cell address converter 5 to be each converted into an address $(x_j + \Delta X_{k-1}, Y_k + \Delta Y_{k-1})$ having shifts of the preceding line block $(\Delta X_{k-1}, \Delta Y_{k-1})$ added thereto, and the converted addresses are produced as addresses of the test image 2 against which the cell matching is to be conducted. When k=0, the values of $\Delta X_{k-1}$ and $\Delta Y_{k-1}$ may be given as $(\Delta X_{k-1}=0$ and $\Delta Y_{k-1}=0)$, as the shifts $(\Delta X_{k-1}=\Delta X_n$ and $\Delta Y_{k-1}=\Delta Y_n)$ at the last line block of the previous test image $(\Delta X_n, \Delta Y_n)^{-1}$, or given as $(\Delta X_{k-1}=\Delta \alpha$ and $\Delta Y_{k-1}=\Delta \beta)$ according to the shifts $(\Delta \alpha, \Delta \beta)$ measured by different means. The pixel gradation value data of the test image 2 according to this address allocation arrangement is forwarded to the cell matching arithmetic unit 4, and a template matching using the selected cells $C_{jk}$ for templates is conducted with respect to the corresponding areas of the test image 2. At this point, because the addresses of the test image 2 are compensated for by the shifts of the preceding line blocks, the so-called search area for the template matching can be narrowed, and the necessary processing time can be significantly reduced. Also, the tolerance on the magnitude of shifts can be increased.

The result of the template matching at the cell matching arithmetic unit 4 consists of a two-dimensional spatial distribution data (a two-dimensional map of cumulative values) formed by a two-dimensional matrix of cumulative values of pixel gradation differences of the cell regions over the entire search area or a part thereof, a minimum value $S_j$ of cumulative values of pixel gradation differences of the cell region, and the relative address $(\Delta X_{jk}, \Delta y_{j1})$ which gives rise to the minimum value $S_j$. The relative address $(\Delta x_{jk}, \Delta y_{j1})$ is an address relative to the address $(x_j, y_k)$ of the selected cell $C_{jk}$. The minimum value $S_j$ is compared with a threshold value in an evaluation unit 6. For instance, if $S_j > TH_s$ (where $TH_s$ is a threshold value which can be determined either arbitrarily or by a computing process of image gradation difference cumulative values), the result of the template matching is determined to be reject. In the evaluation unit 6, a maximum value, a minimum value, a number of local maxima, a number of local minima, and an average value are computed from the two dimensional distribution data of the pixel gradation difference cumulative values, and are evaluated so that the result of the template matching may be determined either good or bad. If the result is good, the address $(\Delta x_{jk}, \Delta Y_{jk})$ giving the minimum value $S_j$ is forwarded to an averaging unit 7, and is averaged along with the other addresses $(\Delta x_{rk}, \Delta y_{rk})$ giving minimum values Sr obtained by the template matching of other selected cells in the same line block. Thus, the positional shifting $(\Delta X_k, \Delta y_k)$ for the line block $LB1_k$ is given by the following equations.

$$\Delta X_k = \frac{\Delta x_{jk} + \Delta x_{rk} + \cdots}{1 + 1 + \cdots} \quad \text{[Equation 1]}$$

$$\Delta Y_k = \frac{\Delta y_{jk} + \Delta y_{rk} + \cdots}{1 + 1 + \cdots}$$

According to an example of an expanded averaging process, a comparison is made between the current positional shift $(\Delta X_k, \Delta Y_k)$ obtained by the averaging process expressed by the above equations with the positional shift $(\Delta x_{k-1}, \Delta y_{k-1})$ of the preceding line block. For instance, if $\Delta x_k - \Delta x_{k-1} > 1$, $\Delta x_k = \Delta x_{k-1} + 1$. Similarly, if $\Delta x_k - \Delta x_{k-1} < -1$, $\Delta x_{k-1} - 1$. By doing so, it is possible to avoid the inconveniences which would be otherwise caused when the positional shifts obtained by the normal averaging process contain large errors due to pseudo matching can be avoided. In other words, it is possible to avoid any excessive positional corrections resulting from detection of excessive positional shifts which are substantially greater than those possible under normal circumstances (whereas the positional shifts between adjacent line blocks are normally in the order of ±1 pixel). Also, the positional correction can be carried out in a gradual manner so that the continuity of an image pattern from one line block to the next can be maintained in a smooth condition.

When the selected cell consists of an x cell, $\Delta y_{jk}$ is rejected. When the selected cell consists of a y cell, $\Delta x_{jk}$ is rejected. In either case, the selected cell is excluded from the averaging process. When the selected cells are absent or no positional shifting is detected from a given line block even when there are selected cells, the positional shift $(\Delta x_k, \Delta y_k)$ of the current line block is set equal to the positional shift $(\Delta x_{k-1}, \Delta Y_{k-1})$ of the preceding line block.

According to the positional shift $(\Delta x_k, \Delta y_k)$ thus determined and stored in the memory 8, there is generated the pixel address for comparison which has been subjected to positional shifting required for comparing the pixels. In other words, when executing the comparison with respect to the line block $LB1_k$ of the test image 2, the gradation value data of the incident pixel of the test image 2 is forwarded to the comparator 11 according to the address (x, y) of the test image 2 generated from the comparison pixel address generator 9. Meanwhile, the pixel address $(x_k, y_k)$ of the reference image 1 corresponding to the address of this incident pixel of the test image is computed.

When a positional shifting is detected in the picture pattern as a result of a cell matching, and the picture pattern extends to adjacent line blocks, the positional correction may be carried out with respect to the adjacent line blocks. For instance, when an address of the k-th line block is to be corrected, the mount of positional correction can be selected from those for any one the adjacent line blocks, or . . . k−1, k, k+1, . . . -th line blocks.

Thus, the reference pixel address $(x_k, y_k)$ can be given by the following equations (assuming that the (k+1)-th address was selected).

$$x_k = x - \Delta X_{k+1} \tag{3}$$

$$y_k = y - \Delta Y_{k+1} \tag{4}$$

where, if k=n (or in case of the last line block), $$x_k = x - \Delta X_n$$

$$y_k = Y - \Delta y_n$$

If required, the equations (3) and (4) can be also given by the following equations (when the k-th line block is selected).

$x_k = x - \Delta X_k$ $y_k = y - \Delta Y_k$

According to the reference pixel address $(x_k, y_k)$ obtained above, the gradation value data of the reference pixel of the reference image is forwarded to the comparator 11. In this manner, the comparative computation is executed with respect to the pixels which are positionally matched between the reference image and the test image.

Figure 2:
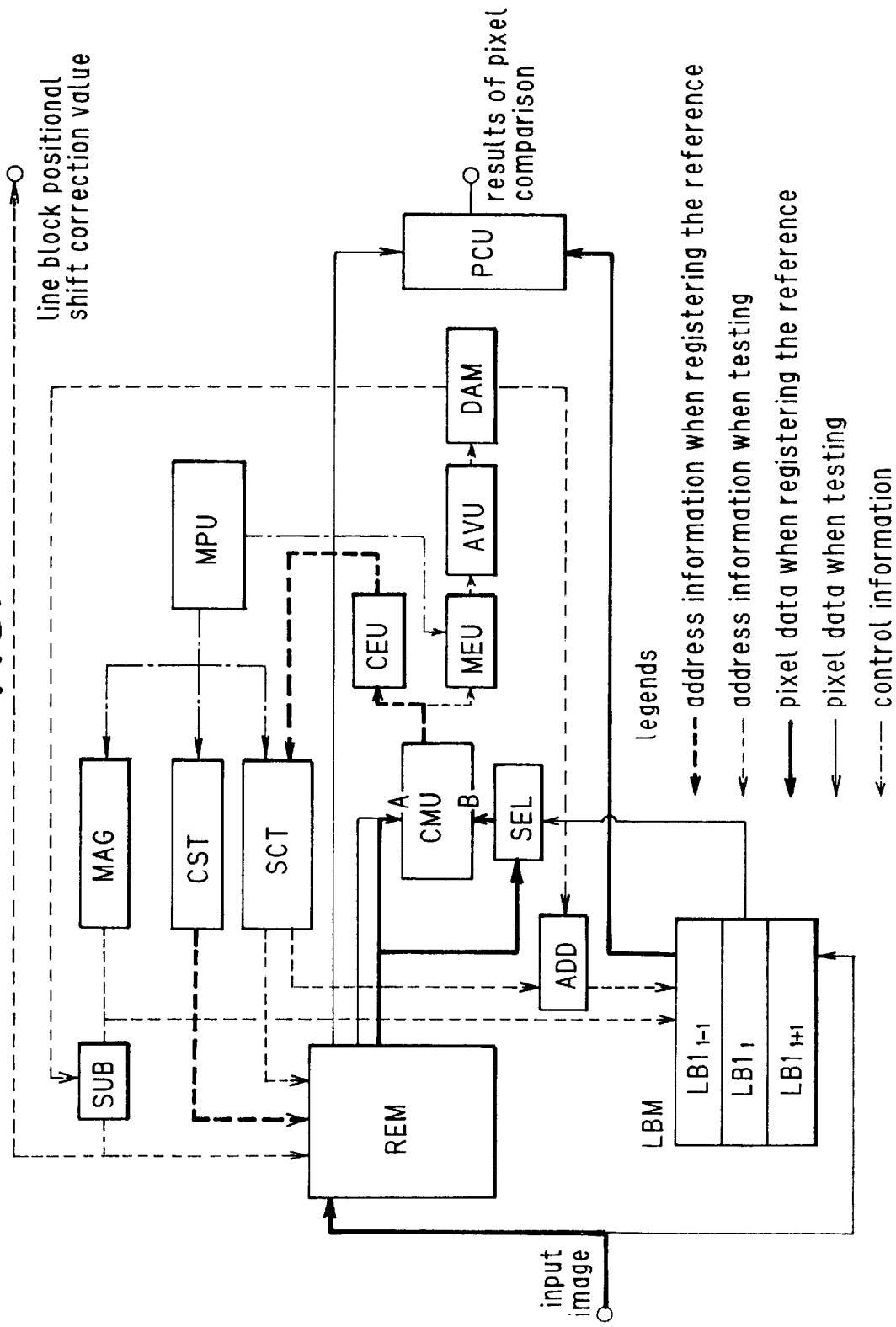
FIG. 2 is a block diagram for illustrating the structure and the mode of operation of the second embodiment of the present invention.

Now a second embodiment of the method of image matching according to the present invention is described in the following with reference to the appended drawings. FIG. 2 is a functional block diagram of the second embodiment.

In the drawing, REM denotes reference image memory which is capable of retaining a frame of the reference image. LBM denotes line block buffer memory, and in the illustrated embodiment, this memory retains three line blocks. However, this number can be freely changed according to the requirements such as the search range and the processing speed in the template matching. The reference image memory REM, the line block buffer memory LBM, and so forth can consist of random access memory or first-in first-out (FIFO) memory as required.

A cell matching arithmetic unit CMU receives selected cell images serving as templates from A input, and the image to be searched from B input, the image to be searched being supplied by a selector SEL which is described hereinafter. The output of the cell matching arithmetic unit CMU consists of a group of pixel difference cumulative values over the entire search range for each individual shifting, and a positional shift value (relative address) which gives rise to the minimum value S of the cumulative values. SEL denotes the selector which supplies, to the B input of the cell matching arithmetic unit CMU, a reference image during the process of registering the reference image, and a test image during the process of testing. ADD denotes a cell address converter which generates the addresses of the test image on which the template matching is to be executed according to the addresses supplied by a selected cell register table SCT which is described hereinafter.

MEU denotes a matching error evaluation unit which determines the result of the template matching for each of the selected cells by evaluating the magnitude of the minimum value S which reflects the extent of mis-match during the testing process. The reference of evaluation may be based on a freely selected threshold value, or a threshold value which is determined statistically according to the group of cumulative values. Alternatively, it may also be determined by a multi-purpose arithmetic unit MPU.

AVU denotes an averaging computation unit which comprises a computation circuit for finding an average value of the positional shifts of a plurality of cells in each line block during the testing process, and, optionally, a comparator for comparing the positional shifts with those of the preceding line block. DMA denotes a positional shift memory which stores at least the positional shifts of the current line block and the preceding line block.

CEU denotes a selected cell evaluation unit which determines the selected cells and classify them into the three categories according to the spatial distribution of the group of cumulative values and the magnitudes of the cumulative values other than the minimum value S. CST denotes a cell evaluation order determination table which determines which of the cells should be evaluated and the order of evaluating those cells that are going to be evaluated when evaluating all the cells of each line block for selective purpose by self template matching in a sequential manner.

Normally, to avoid any local unevenness in the selection of cells, the order is assigned in a random fashion. Because it is sometimes advantageous to control the locations of the selected cells according to the nature of the picture pattern, the locations of the cells to be valuated may be allowed to be freely determined by the multi-purpose arithmetic unit MPU which is described hereinafter. SCT denotes a selected cell register table corresponding to the selected cell address generator, and performs the function of registering the addresses and the classifications of all the selected cells following the input of the reference image and the subsequent process of cell selection.

MAG denotes a comparative pixel address generator which generates and outputs addresses in synchronism with the start timing and the line start timing of the input image, and a pixel clock. SUB denotes a subtractor corresponding to the comparative pixel address converter, and generates addresses by subtracting the positional shifts stored in the positional shifting memory DAM from the comparative pixel addresses generated from the comparative pixel address generator, which is described hereinafter, during the testing process, and uses them as the comparative pixel addresses of the reference image memory REM. PCU denotes a pixel comparator which executes a comparative arithmetic operation with respect to the pixel gradation value data of the pixels which are stored in the reference image memory REM or memory (not shown in the drawing) having a same address space as REM and have been subjected to positional correction with the pixels stored in the line block buffer memory LBM.

MPU denotes a multi-purpose arithmetic unit which sets the operating conditions and the data for the functional blocks, and carries out the control of the overall operation of the functional blocks.

Figure 3:
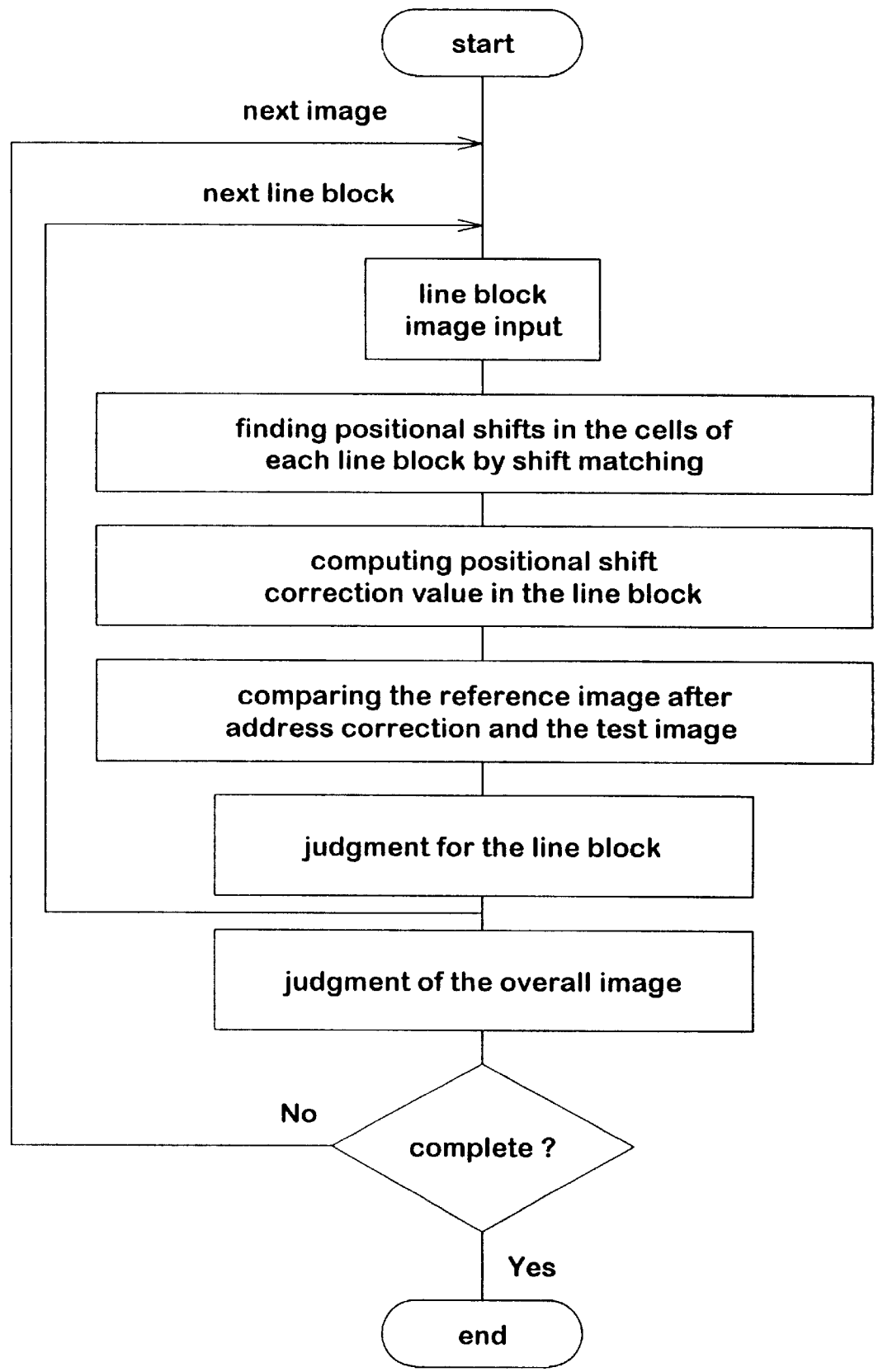
FIG. 3 is a flow chart showing the processing procedure of the above described embodiment.

Now the mode of operation of the above embodiment is described in the following. FIG. 3 is a flow chart for describing the mode of operation.

In the initial step of registering the reference, the input image is stored and retained in the reference image memory REM. Then, the cells at the addresses designated by the cell evaluation order setup table CST are transferred from the reference image memory REM to the cell matching arithmetic unit CMU where the cell matching is carried out. Cumulative values of pixel differences are forwarded to the selected cell evaluation unit CEU to be evaluated and classified accordingly, and the selected cells are registered at the selected cell registration table SCT. This completes the step of registering the reference.

Thereafter, the test image is supplied to the line block buffer memory LBM one line block at a time, and the part of the test image at the test image addresses generated by converting the addresses designated by the selected cell registration table SCT is forwarded to the cell matching arithmetic unit CMU via the selector SEL. Meanwhile, the selected cells at the addresses designated by the selected cell registering table SEL is forwarded to the cell matching arithmetic unit CMU from the reference image memory REM. The template matching is then carried out with respect to the selected cells, and data such as cumulative pixel difference values is forwarded to the matching error evaluation unit MEU to be evaluated thereby. The results of evaluation with respect to a plurality of selected cells are averaged by the averaging arithmetic unit AVU, and the positional shifting in the corresponding line block is computed, and is forwarded to the positional shifting memory DAM to be retained therein.

The comparison of pixels in the reference and test images is executed as described in the following. A time delay is given to the line block of the test image which has been stored in the line block buffer memory LBM until the necessary positional shifts are obtained, and is forwarded to the pixel comparator PCU in a sequential manner. The pixels of the reference image stored in the reference image memory REM corresponding to the above line block are supplied to the pixel comparator PCU, and are compared with the corresponding pixels of the test image in the pixel comparator PCU. The addresses of the pixels for comparison are generated by the comparison pixel address generator MAG, and are forwarded to the line block buffer memory LBM and the reference image memory REM. The addresses forwarded to the reference image memory REM are subjected to a positional shifting correction computing process in the subtractor SUB. The image to be compared with the test image is not limited to the image stored in the reference image memory REM, but may also be an image stored externally. Therefore, depending on the case, the output from the subtractor SUB may be supplied to outside the system as positional correction values.

In this embodiment, the pixel addresses of the reference image memory REM were corrected by using the pixel addresses of the line block buffer memory LBM as a reference, but because the pixel addresses are treated as relative addresses between the two images, the reference of the addresses may be set on the pixel addresses of the reference image memory REM.

Now an embodiment of the product testing device using the image positional matching method of the present invention is described in the following.

Figure 4:
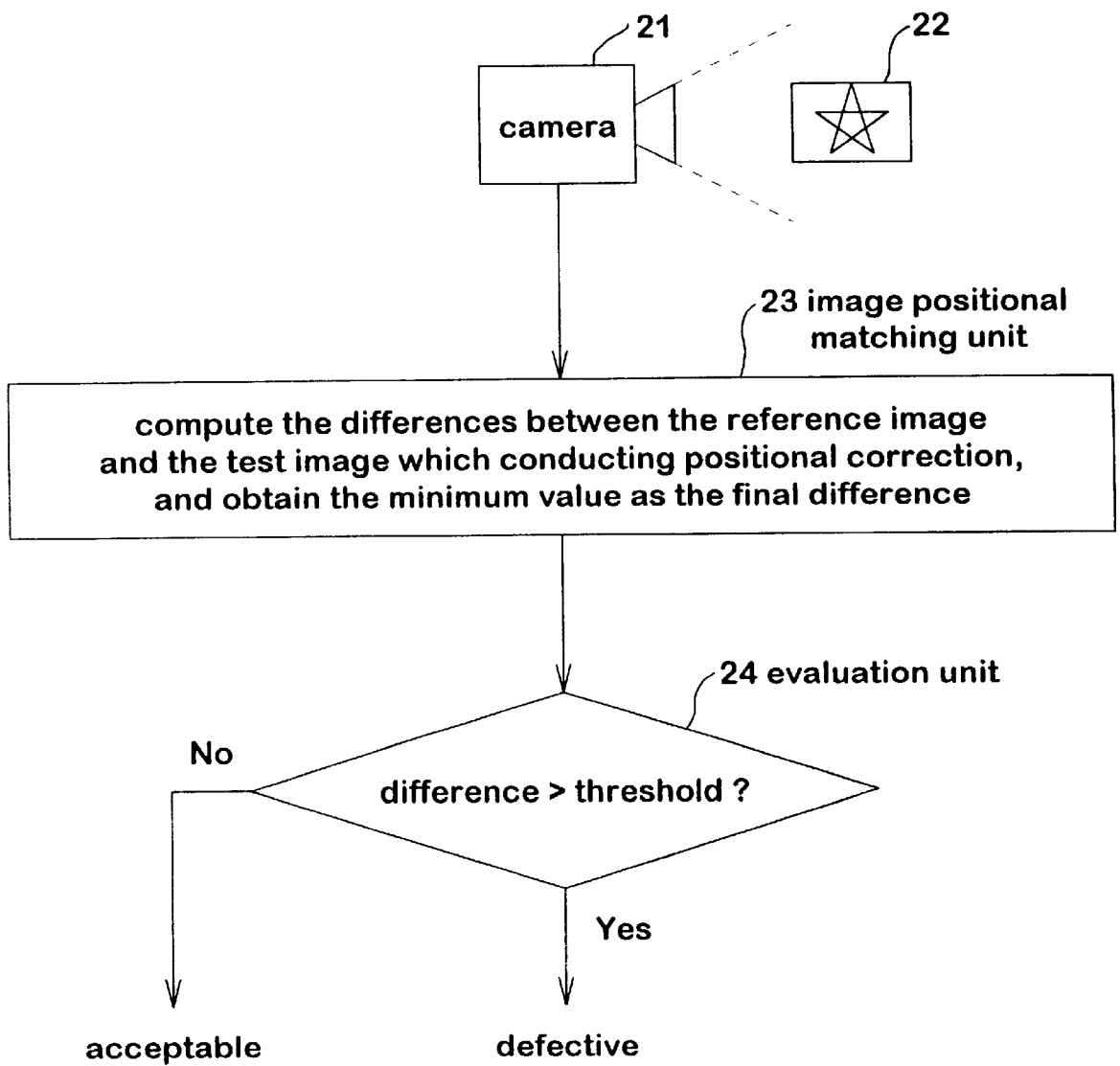
FIG. 4 is a flow chart showing the processing procedure of the above described embodiment.
Figure 5:
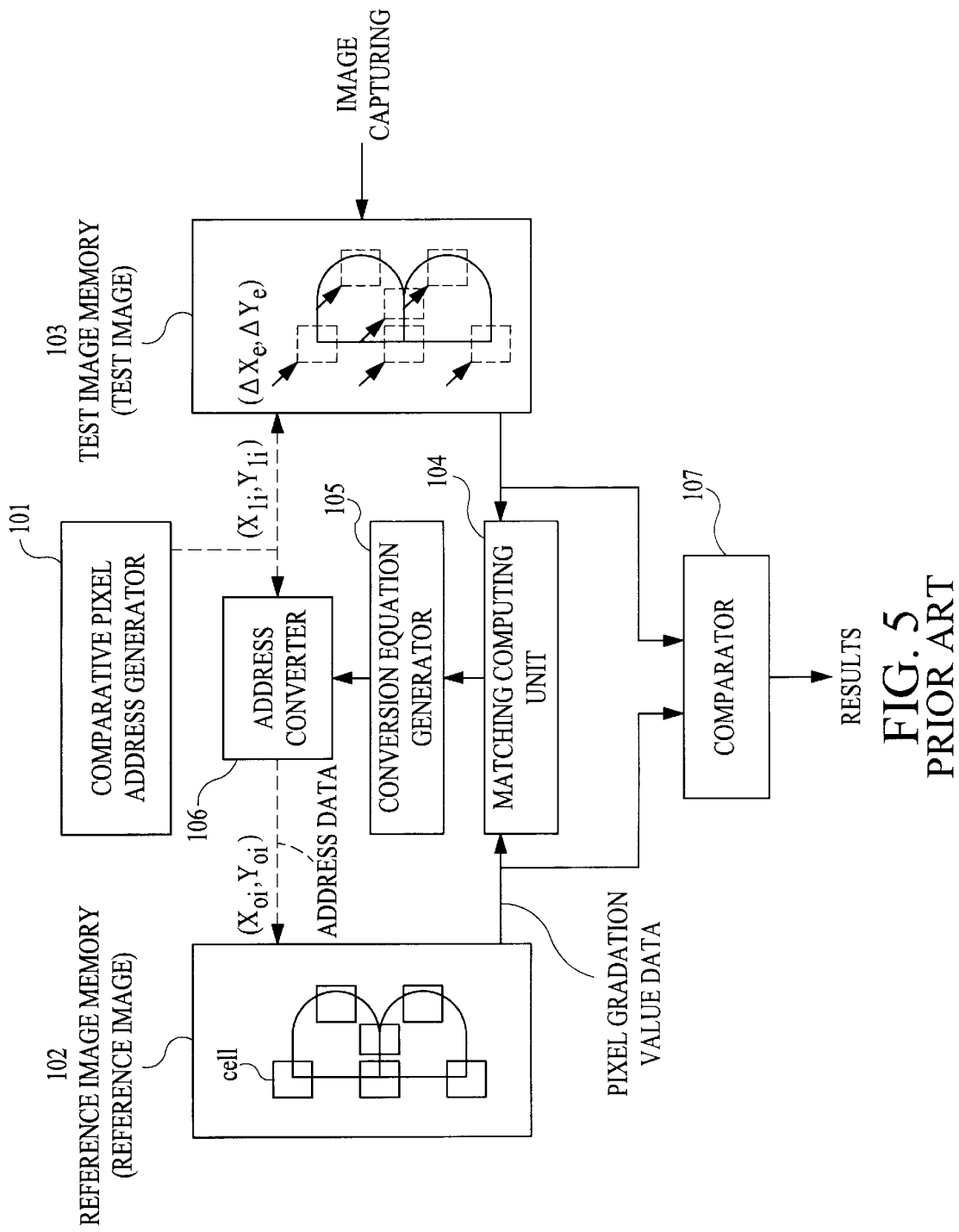
FIG. 5 is a conceptual diagram showing a typical geometric transformation process found in prior act testing systems.
Figure 6:
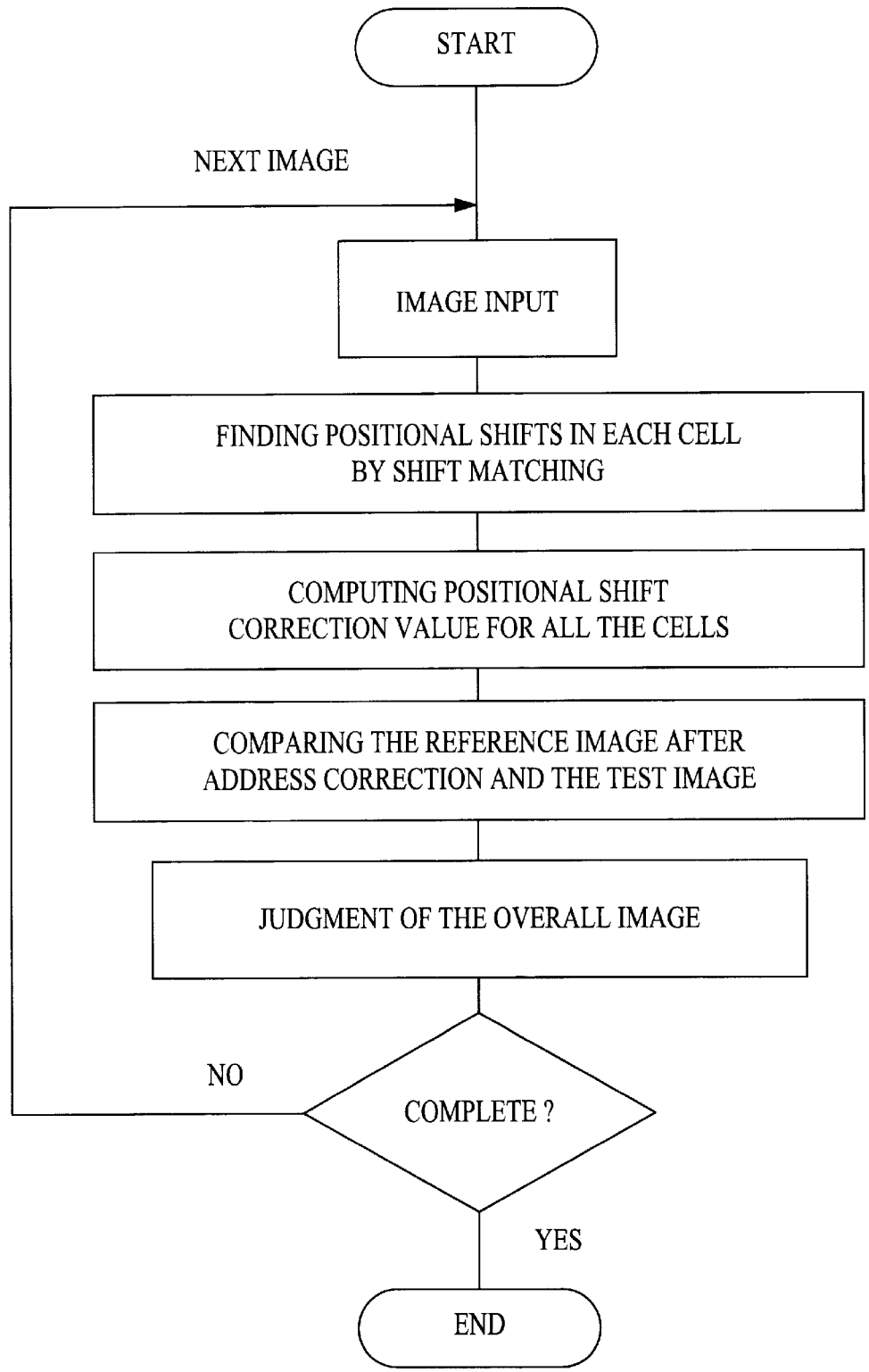
FIG. 6 is a flow chart showing the processing procedure of the prior art.

FIG. 4 is a drawing for illustrating both the structure and mode of operation of this embodiment. Numeral 21 denotes a camera for capturing the image of the external appearance of the product 22 to be tested, and the image may comprise whatever is printed on this product. The image captured by the camera 21 is sequentially forwarded to an image positional matching unit 23 by each line block. The structure of the positional matching unit 23 may be as illustrated in FIGS. 1 and 2, and the positional matching unit 23 computes the differences between the reference image which is registered in advance and the input image from the camera 21 while making corrections based on the positional matching for each line block, and generates a minimum value as a difference value. Numeral 24 denotes a determination unit for determining if the difference value produced from the image positional matching unit is greater than the threshold value or not to determine if there are any defects in the external appearance of the product 22 or the contents of the print thereon.

According to the above described embodiments of the present invention, the invention was applied to the testing of products which is based on the comparison of the pixels of two images. But, the present invention can be equally applied to other applications where positional shifting is required to be measured quickly and at high precision such as the measurement of fluctuations of speed, lateral deviation, and positional shifting in the field of conveying an object at a fixed speed.

As can be appreciated from the above description, according to the algorithm of the image positional matching method of the present invention which sequentially tests the positional shifts for each of the line blocks dividing the image into a number of equal parts, because the positional matching between the reference image and the test image is executed for each line block in both X and Y directions, even when the test image includes non-linear shifts and elongation/shrinkage, positional matching involving a minimum error can be accomplished, and a high level of reliability can be achieved. Also, because the positional shifts can be computed within a limited delay time corresponding to only a few line blocks (Because each line block normally consists of a few to a few dozen lines, and the image is typically hundreds or thousands lines wide, this time delay is estimated to be only a fraction of the time required for inputting the entire image.), the comparative computation of the pixels can be executed substantially simultaneously as the inputting of the image, and the time period required for the testing process can be made extremely short. Because the testing process could not be started until the entire image has been read according to the conventional method, the present invention can achieve a substantial reduction in the processing time. Furthermore, because the test image becomes unnecessary as soon as the computing of the positional shifting and the comparison of the pixels are completed, the test image can be renewed for each line block, and only a few line blocks of the test image are required to be retained at a time. Thus, the image memory required for storing the test image can be reduced to a fraction of that required for storing the entire image.

In the image positional matching method of the present invention, if the results of the template matching with respect to the reference image are quantitatively evaluated in selecting the cells serving as the templates in the template matching for computing positional shifting, and the selected cells are registered after classifying them into three types, a sufficient number of selected cells including picture patterns suitable for computing positional shifting can be obtained, and positional matching can be achieved in a stable manner and with a minimum error.

Also, in the image matching method of the present invention, if the positional shifting is carried out by selectively using only those positional shifting values by the evaluation of the results of positional matching with respect to the template matching in the test image for computing the positional shifting, abnormal positional shifting values are rejected, and positional matching can be achieved in a stable manner and with a minimum error.

In the image position matching method, when the positional shifting values obtained from a plurality of cells are averaged in the template matching of the test image to compute the positional shifting values, abnormal positional shifting values are rejected, and positional matching can be achieved in a stable manner and with a minimum error.

In the method for positional matching of images according to the present invention, if the positional shifting computed for a certain line block is greater than that of the preceding line block by more than a threshold value in the step of computing the positional shifting of the image, the positional shifts of the certain line block may be set equal to a predetermined value. In such a case, it is possible to avoid any undesirable results which could occur if too much error is caused by pseudo matching, or to avoid the cases of excessive positional shift correction which are excessive in the sense that the amount of positional shift correction far exceeds what are actually possible, and the positional shift correction can be effected in a gradual manner so that the connection of the image between line blocks may be kept smooth even after positional shift correction has been executed.

In the method for positional matching of images according to the present invention, if a template matching is conducted for a certain line block with respect to the test image by using the cells or the selected cells of the reference image as templates, the address of each of the cells of the test image may be compensated for according to the positional shifting of the preceding line block with respect to the cell or the selected cell of the reference image at the corresponding address, the so-called search area when conducting the template matching can be narrowed, and the processing time can be substantially reduced while the tolerance to the positional shifting can be increased.

In the method for positional matching of images according to the present invention, if the positional matching compensation process for each of the line blocks is conducted according to the positional shifting of one of the line blocks preceding the current line block or the positional shifting of one of the line blocks following the current line block, the accumulation of positional shifting can be properly accounted for.

As for the system for testing products according to the present invention, it employs image capturing means for sequentially entering a horizontal scan line or a group of horizontal scan lines of an image of a product to be tested, positional shifting computing means for computing positional shifting of an image based on cell matching conducted for each line block consisting of a prescribed number of adjacent horizontal scan lines of the test image and a reference image, compensating means for compensating the positional shifting of the test image with respect to the reference image according to the positional shifting computed by the positional shifting computing means, and difference computing means for comparing the test image, for which the positional shifting was compensated, with the reference image, and obtaining differences between them, so that each product may be judged whether it is defective or not by determining the identity of the two images according to the computed differences between them. Therefore, the shape of the product and the picture pattern on the product can be evaluated on a real time basis, with a minimum amount of hardware, in a short time, while tolerating the presence of non-linear image positional shifting.

What we claim is:

1. A method for positional matching of images, wherein image data of two images of an identical picture pattern are compared by using image data of one of the images as reference data, and positional shifting between the two images is compensated for when determining an identity of the images according to computed differences between them, characterized by that:

as ahorizontal scan line or a group of horizontal scan lines from an image are sequentially transfered, a positional shifting computing process and a positional matching compensation process based on the computed shifting are performed for each line block such that the position shifting computed by the positional shifting computing process for one line block may be different from the positional shifting computed for another line block, wherein a line block includes a single horizontal scan line or a predetermined number of consecutive horizontal scan lines with respect to the two images of a normally identical image pattern;

wherein if the positional shifting computed for a certain line block is greater than the preceding line block by more than a threshold value, the positional shifting of the certain line block is set equal to predetermined value.

2. A method for positional matching of images according to claim 1, wherein the positional shifting computing process comprises the steps of:

conducting a template matching with respect to the other image by using selected cells, obtained by dividing each of the line blocks of the reference image into a number of cells, as templates;

quantitatively evaluating the results of the template matching as being either good or bad; and computing the positional shifting of the images according to the results of the template matching which are evaluated as being good.

3. A method for positional matching of images according claim 1, wherein the positional matching compensation process for each of the line blocks is conducted according to the positional shifting of one of the line blocks preceding the current line block or the positional shifting of one of the line blocks following the current line block.

4. A method for positional matching of images according to claim 2, wherein if there are a plurality of cells serving as templates or selected cells in a line block of the reference image, there are a plurality of good matching results, and a plurality of incidences of positional shifting are obtained for a corresponding line block of the other image, then, the result of the positional shifting computing process is given as an average of the incidences of positional shifting.

5. A method for positional matching of images, wherein image data of two images of an identical picture pattern are compared by using image data of one of the images as reference data, and positional shifting between the two images is compensated for when determining an identity of the two images according to computed differences between them, characterized by that:

as a horizontal scan line or a group of horizontal scan lines from an image are sequentially transferred, a positional shifting computing process and a positional matching compensation process based on the computed shifting are performed for each line block such that the positional shifting computed by the positional shifting computing process for one line block may be different from the positional shifting computed for another line block, wherein a line block includes a single horizontal scan line or a predetermined number of consecutive horizontal scan lines with respect to the two images of a nominally identical image pattern;

wherein the positional shifting computing process comprises the steps of:

dividing each line block of the reference image into a number of cells;

conducting a template matching on the reference image by using the cells as templates;

selecting those cells which are effective in computing positional shifting by quantitatively evaluating the results of the template matching;

classifying the selected cells into x-, y-, and xy- cells as those which are effective in detecting the shifting in x, y and both x and y directions, respectively, and registering them as such; and conducting a template matching with respect to the other image by using the registered selected cells as templates, and computing positional shifting of the other image according to the result of the template matching.

6. A method for positional matching of images according to claim 5, wherein when a template matching is conducted for a certain line block with respect to the other image by using the cells or the selected cells of the reference image as templates, the address of each of the cells of the other image is compensated for according to the positional shifting of the preceding line block with respect to the cell or the selected cell of the reference image at the corresponding address.

7. A system for testing products by positional matching of images, comprising:

image capturing means for sequentially entering a horizontal scan line or a group of horizontal scan lines of an image of a product to be tested;

positional shifting computing means for computing positional shifting of an image based on cell matching conducted for each line block, each line block consisting of a prescribed number of adjacent horizontal scan lines of a test image and a reference image, the positional shifting computing means computing a positional shifting for each line block which may be different from the positional shifting computed for another line block, wherein if the positional shifting computed for a certain line block is greater than the preceding line block by more than a threshold value, the positional shifting of the certain line block is set equal to a predetermined value;

compensating means for compensating the positional shifting of the test image with respect to the reference image according to the positional shifting computed by the positional shifting computing means;

difference computing means for comparing the test image, for which the positional shifting was compensated, with the reference image and obtaining differences between them; and judging means for judging whether each product is defective or not by determining the identity of the two images according to the computed differences between them;

the positional shifting of each line block being compensated for before determining the identity of the two images.

8. The system of claim 7, wherein the positional shifting computing means comprises:

template matching means for conducting a template matching with respect to the other image by using selected cells, obtained by dividing each of the line blocks of the reference image into a number of cells, as templates;

evaluating means for quantitatively evaluating the results of the template matching as being either good or bad; and computing means for computing the positional shifting of the images according to the results of the template matching which are evaluated as being good.

9. The system of claim 7, wherein the positional matching compensation process for each line block is conducted according to the positional shifting of one of the line blocks preceding the current line block or the positional shifting of one of the line blocks following the current line block.

10. The system of claim 8, wherein if there are a plurality of cells serving as templates or selected cells in a line block of the reference image, there are a plurality of good matching results, and a plurality of incidences of positional shifting are obtained for a corresponding line block of the other image, then the result of the positional shifting computing process is given as an average of the incidences of positional shifting.

11. A system for testing products by positional matching of images, comprising:

image capturing means for sequentially entering a horizontal scan line or a group of horizontal scan lines of an image of a product to be tested;

positional shifting computing means for computing positional shifting of an image based on cell matching conducted for each line block, each line block consisting of a prescribed number of adjacent horizontal scan lines of a test image and a reference image, the positional shifting computing means computing a positional shifting for each line block which may be different from the positional shifting computed for another line block;

compensating means for compensating the positional shifting of the test image with respect to the reference image according to the positional shifting computed by the positional shifting computing means;

difference computing means for comparing the test image, for which the positional shifting was compensated, with the reference image and obtaining differences between them; and judging means for judging whether each product is defective or not by determining the identity of the two images according to the computed differences between them;

the positional shifting of each line block being compensated for before determining the identity of the two images;

wherein the positional shifting computing means comprises:

dividing means for dividing each line block of the reference image into a number of cells;

reference template pattern matching means for conducting a template matching on the reference image by using the cells as templates;

selecting means for selecting those cells which are effective in computing positional shifting by quantitatively evaluating the results of the template matching;

classification means for classifying the selected cells into x-, y- and xy- cells as those which are effective in detecting the shifting in x, y and both x and y directions, respectively, and registering them as such; and test template pattern matching means for conducting a template matching with respect to the other image by using the registered selected cells as templates, and computing positional shifting of the other image according to the result of the template matching.

12. The system of claim 11, wherein when a template matching is conducted for a certain line block with respect to the other image by using the cells or the selected cells of the reference image as templates, the address of each of the cells of the other image is compensated for according to the positional shifting of the preceding line block with respect to the cell or the selected cell of the reference image at the corresponding address.

* * * * *